United States Patent
Lee

(10) Patent No.: US 8,442,323 B2
(45) Date of Patent: May 14, 2013

(54) HANDWRITING RECOGNITION DEVICE HAVING AN EXTERNALLY DEFINED INPUT AREA

(75) Inventor: Chun-Yu Lee, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 234 days.

(21) Appl. No.: 12/826,679

(22) Filed: Jun. 30, 2010

(65) Prior Publication Data

US 2011/0249898 A1 Oct. 13, 2011

(30) Foreign Application Priority Data

Apr. 7, 2010 (TW) .............................. 99110661 A

(51) Int. Cl.
*G06K 9/00* (2006.01)

(52) U.S. Cl.
USPC ............ 382/187; 382/181; 382/188; 382/189

(58) Field of Classification Search .................. 382/181, 382/187, 189, 154, 312, 315, 325, 100, 115, 382/127, 103, 106, 107
See application file for complete search history.

(56) References Cited

U.S. PATENT DOCUMENTS

| 6,911,972 | B2 * | 6/2005 | Brinjes | 345/175 |
|---|---|---|---|---|
| 7,273,174 | B2 * | 9/2007 | Chiang et al. | 235/454 |
| 7,278,323 | B2 * | 10/2007 | Hartmann et al. | 73/761 |
| 7,417,664 | B2 * | 8/2008 | Tomita | 348/43 |
| 2005/0111735 | A1 * | 5/2005 | Sheinin | 382/187 |
| 2005/0265580 | A1 * | 12/2005 | Antonucci et al. | 382/103 |
| 2010/0053324 | A1 * | 3/2010 | Kim et al. | 348/142 |
| 2010/0102199 | A1 * | 4/2010 | Negley et al. | 250/201.1 |
| 2010/0321559 | A1 * | 12/2010 | Wolfe et al. | 348/371 |

* cited by examiner

*Primary Examiner* — Edward Park
(74) *Attorney, Agent, or Firm* — Altis Law Group, Inc.

(57) ABSTRACT

A handwriting recognition device includes a main body having a side surface and an operation surface perpendicularly connecting to the side surface, and a first lens module and a second lens module arranged at opposite sides of the side surface. A first optical axis of the first lens module extends to perpendicularly cross a second optical axis of the second camera module outside the side surface. An overlapped area of a view angle of the first lens module and a view angle of the second lens module is defined as an input area. The first lens module is configured to capture a first picture of a handwriting tool in the input area. The second lens module is configured to capture a second picture of the handwriting tool in the input area. The handwriting recognition device calculates coordinates of the handwriting tool according to the first and the second pictures.

14 Claims, 8 Drawing Sheets

HANDWRITING RECOGNITION DEVICE HAVING AN EXTERNALLY DEFINED INPUT AREA

BACKGROUND

1. Technical Field

The present disclosure relates to a handwriting recognition device, and more particularly, to handwriting recognition device having an externally defined input area.

2. Description of Related Art

Touch panels are widely used in all kinds of small electronic devices such as mobile phones, portable media players, and digital cameras. A typical touch panel is normally attached to an operation surface or a display screen of a small electronic device to realize a handwriting input function. However, an area of the touch panel is limited according to the small size of the small electronic device. Thus, the small electronic device with limited input area is inconvenient to use.

Therefore, a new handwriting recognition device is desired to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various inventive embodiments of the present disclosure in detail, wherein like numerals refer to like units throughout.

Figure 1:
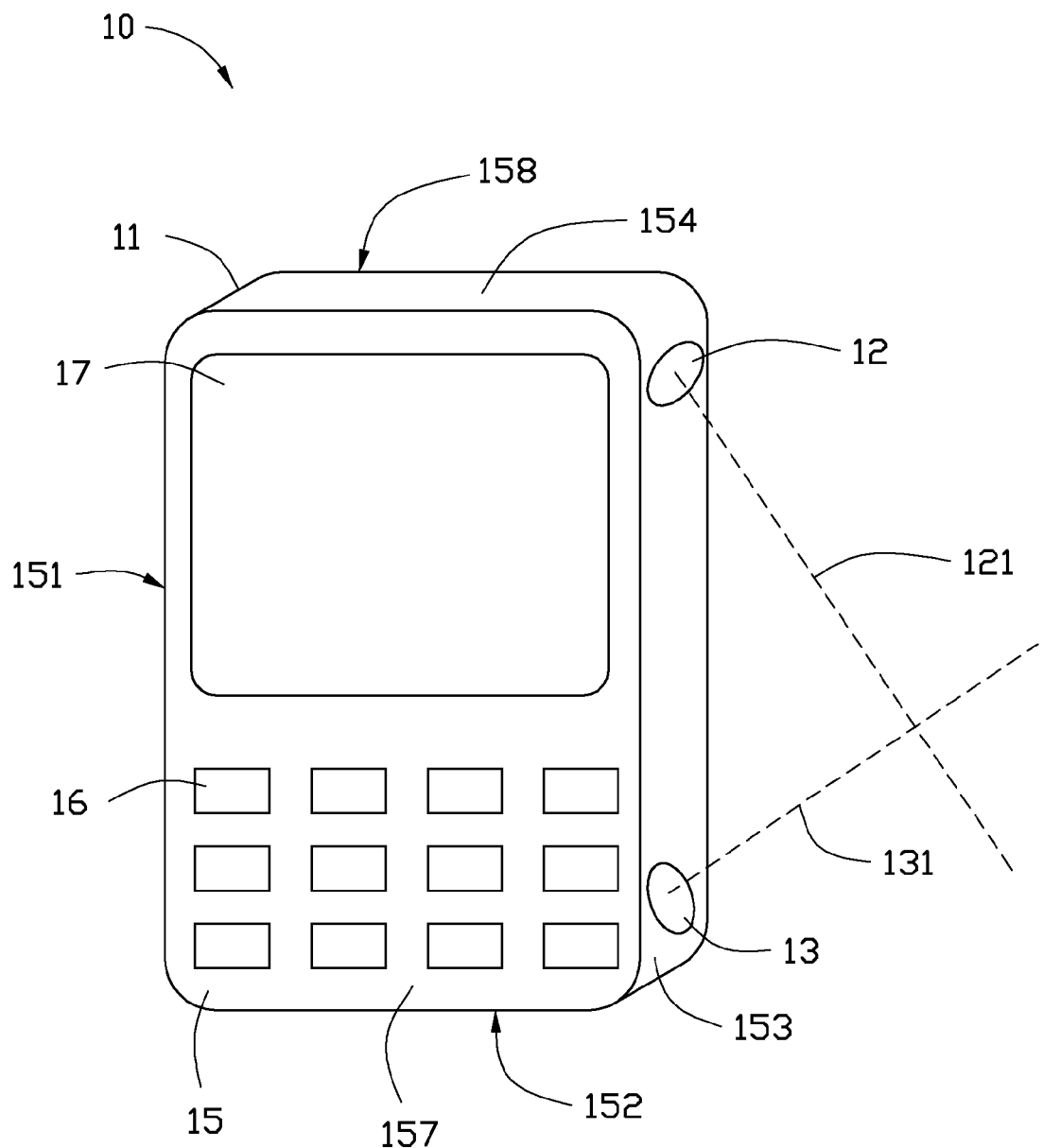
FIG. 1 is a schematic, solid view of a handwriting recognition device according to a first embodiment of the present disclosure.

Referring to FIG. 1, a handwriting recognition device 10 according to a first embodiment of the present disclosure is shown. The handwriting recognition device 10 includes a main body 11, a first lens module 12, and a second lens module 13. In this embodiment, the main body 11 is a mobile phone. In some embodiment, the main body 11 can be other small electronic devices such as portable media player or digital camera.

The main body 11 includes a controller (not shown), a cubic shell 15, a keyboard 16, a display screen 17, and an internal circuit board (not shown). The controller and the internal circuit board are received inside the shell 15.

The shell 15 includes a square operation surface 157 and an opposite square supporting surface 158, a first side surface 151, a second side surface 152, a third side surface 153, and a fourth side surface 154. The side surfaces 151 to 154 are substantially perpendicularly connected between the operation surface 157 and the supporting surface 158. The first side surface 151 and the third side surface 153 are opposite to each other and arranged along the long sides of the operation surface 157, correspondingly. The second side surface 152 and the fourth side surface 154 are opposite to each other and arranged along the corresponding short sides of the operation surface 157. In this embodiment, an area of either the operation surface 157 or the supporting surface 158 is larger than that of one of the surfaces 151 to 154.

The keyboard 16 and the display screen 17 are formed on the operation surface 157 and are electrically connected to the controller and the internal circuit board. A user can input control instructions or messages signals via the keyboard 16 to the controller. The controller is configured to control the display image of the display screen 17 according to the inputted control instruction or message signals.

The first lens module 12 and the second lens module 13 are arranged on the third side surface 153. View angles of both the first lens module 12 and the second lens module 13 are greater than 90 degrees. The first lens module 12 is substantially adjacent to the fourth side 154 and includes a first optical axis 121. The first optical axis 121 is substantially parallel to the operation surface 157 and slanted to the third side surface 153 at a first angle of 45 degrees. The second lens module 13 is adjacent to the second side surface 152 and includes a second optical axis 131. The second optical axis 131 is substantially parallel to the operation surface 157 and slanted to the third side surface 153 at a second angle of 45 degrees. In one embodiment, the first optical axis 121 perpendicularly crosses the second optical axis 131 in a vicinity outside the third side surface 153. The handwriting recognition device 10 defines an externally input area where the view angle of the first lens module 12 meets and overlaps with the view angle of the second lens module 13 at the outside of the third side surface 153.

When the environment is bright enough for the first lens module 12 and the second lens module 13 to take picture, a user can move a handwriting tool such as a finger or a handwriting pen in the externally defined input area to realize the handwriting input function. When the handwriting recognition device 10 works in a handwriting mode, the first lens module 12 and the second lens module 13 normally works to capture pictures of the handwriting tool in the externally defined input area. The first lens module 12 takes a first picture of the handwriting tool and sends the first picture to the controller. The second lens module 13 takes a second picture of the handwriting tool and sends the second picture to the controller. The controller correspondingly calculates coordinates of a top portion of the handwriting tool according to the first and the second pictures in predetermined Cartesian coordinates. The predetermined Cartesian coordinates takes the first optical axis as the x-coordinate and the second optical axis as the y-coordinate.

Figure 2:
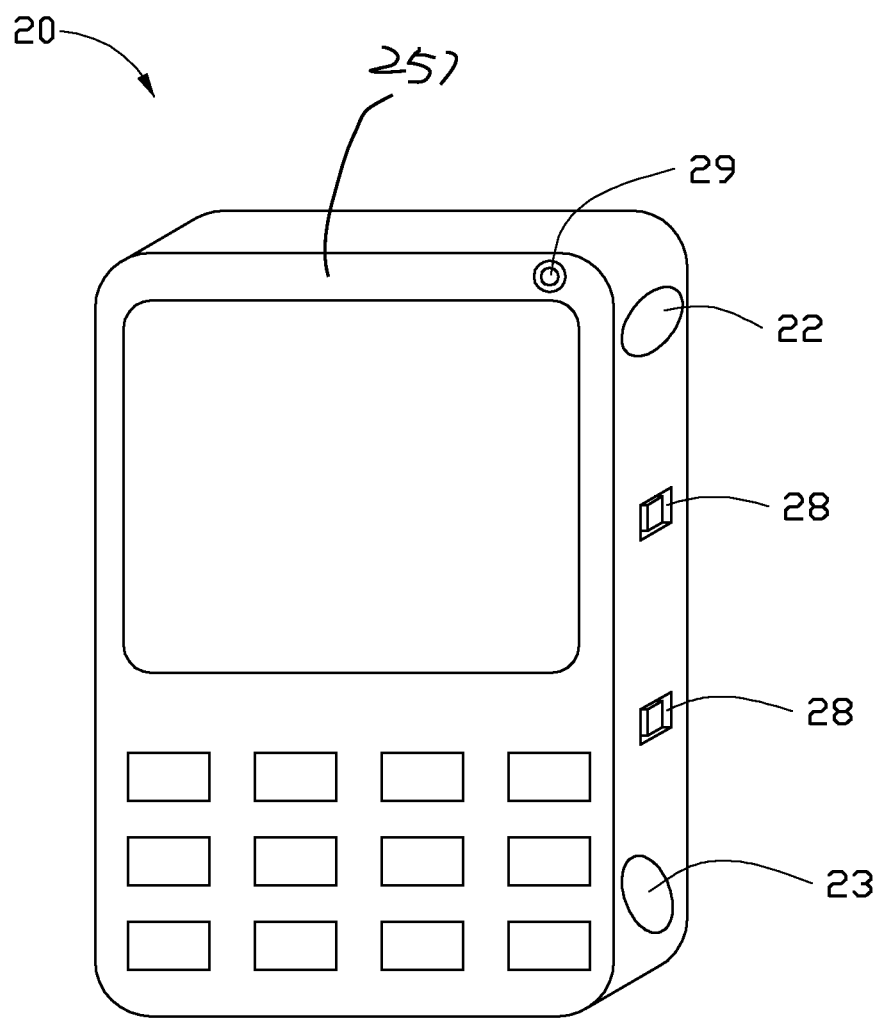
FIG. 2 is a schematic, solid view of a handwriting recognition device according to a second embodiment of the present disclosure.

Referring to FIG. 2, a handwriting recognition device 20 according to a second embodiment of the present disclosure is shown. The handwriting recognition device 10 differs from the handwriting recognition device 10 in that the handwriting recognition device 20 further includes one or more light sources 28 positioned on third side surface 253, and a light sensor 29 positioned on the operation surface 257. In this embodiment, the light sources 28 are light emitting diodes. The light source 28 and the light sensor 29 are also controlled by a controller (not shown). The light sensor 29 is used to sense environment brightness and generate an assistant signal when the environment brightness is below a predetermined brightness. The one or more light sources 28 correspondingly turn on according to the assistant signal for illuminating the externally defined input area. Thus, the first lens module 22 and the second lens module 23 can work normally even when the environment is dark.

Figure 3:
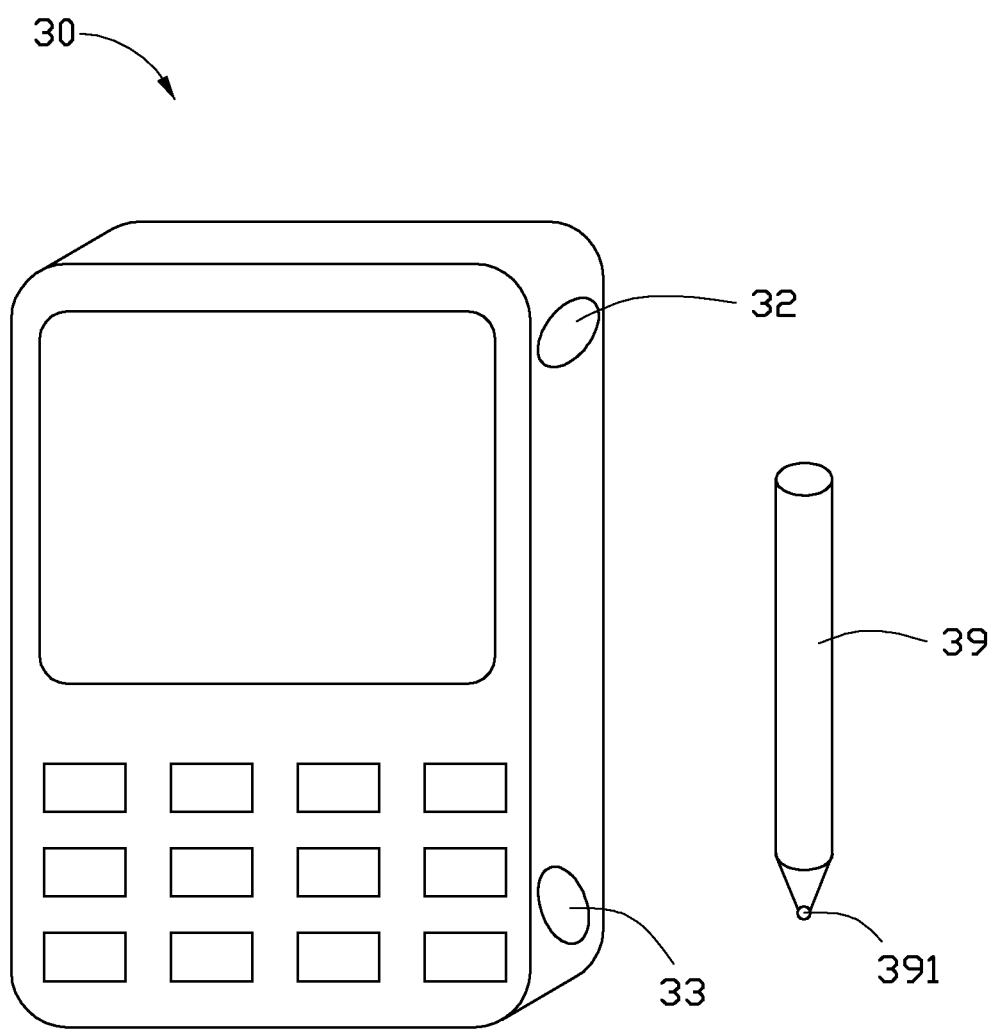
FIG. 3 is a schematic, solid view of a handwriting recognition device according to a third embodiment of the present disclosure.

Referring to FIG. 3, a handwriting recognition device 30 according to a third embodiment of the present disclosure is shown. The handwriting recognition device 30 differs from the handwriting recognition device 10 in that the handwriting recognition device 30 further includes a handwriting tool 39, such as a handwriting pen. The handwriting tool 39 includes a point light source 391 formed at its top portion. In this embodiment, the point light source 391 is a light emitting diode. When the point light source 391 turns on, the first lens module 32 and second lens module 33 can take the first and the second pictures even when the environment brightness is below the predetermined brightness.

Referring to FIGS. 4 to 8, a handwriting recognition device 40 according to a fourth embodiment of the present disclosure is shown. The handwriting recognition device 40 includes a main body 41, a lens module 42, a supporting rod 43, and a handwriting pen 49.

The main body 41 includes a controller (not shown), a shell 45, a keyboard 46, a display screen 47, and an internal circuit (not shown). The shell 45 is configured in a cubic fashion and includes an operation surface 457, an opposite supporting surface 458, a first side surface 451, a second side surface 452, a third side surface 453, and a fourth side surface 454. The first to fourth side surfaces 451 to 454 are substantially perpendicularly connected between the operation surface 457 and the supporting surface 458 from end to end. The first side surface 451 and the third side surface 452 are opposite to each other and arranged along the long sides of the operation surface 457, correspondingly. The second side surface 452 and the fourth side surface 454 are opposite to each other and arranged along the short sides of the operation surface 457, correspondingly. The operation surface 457 defines a groove 455 for receiving the supporting rod 43. The second side surface 452 defines an opening 50 for receiving the handwriting pen 49 opposite to the groove 455. The groove 455 is substantially adjacent to the third side surface 453 and substantially parallel to the third side surface 453. The opening 50 is extended along a direction coaxial with the groove 455 and is arranged opposite to the groove 455.

The supporting rod 43 includes a connecting end 431 and an opposite free end 432. The connecting end 431 is received in the groove 455 and is fixed in the groove 455 by a rotatable connector 456. Thus, the free end 432 of the supporting rod 43 can rotate around the connecting end 431 at an angle in range of about 0-90 degrees.

Figure 4:
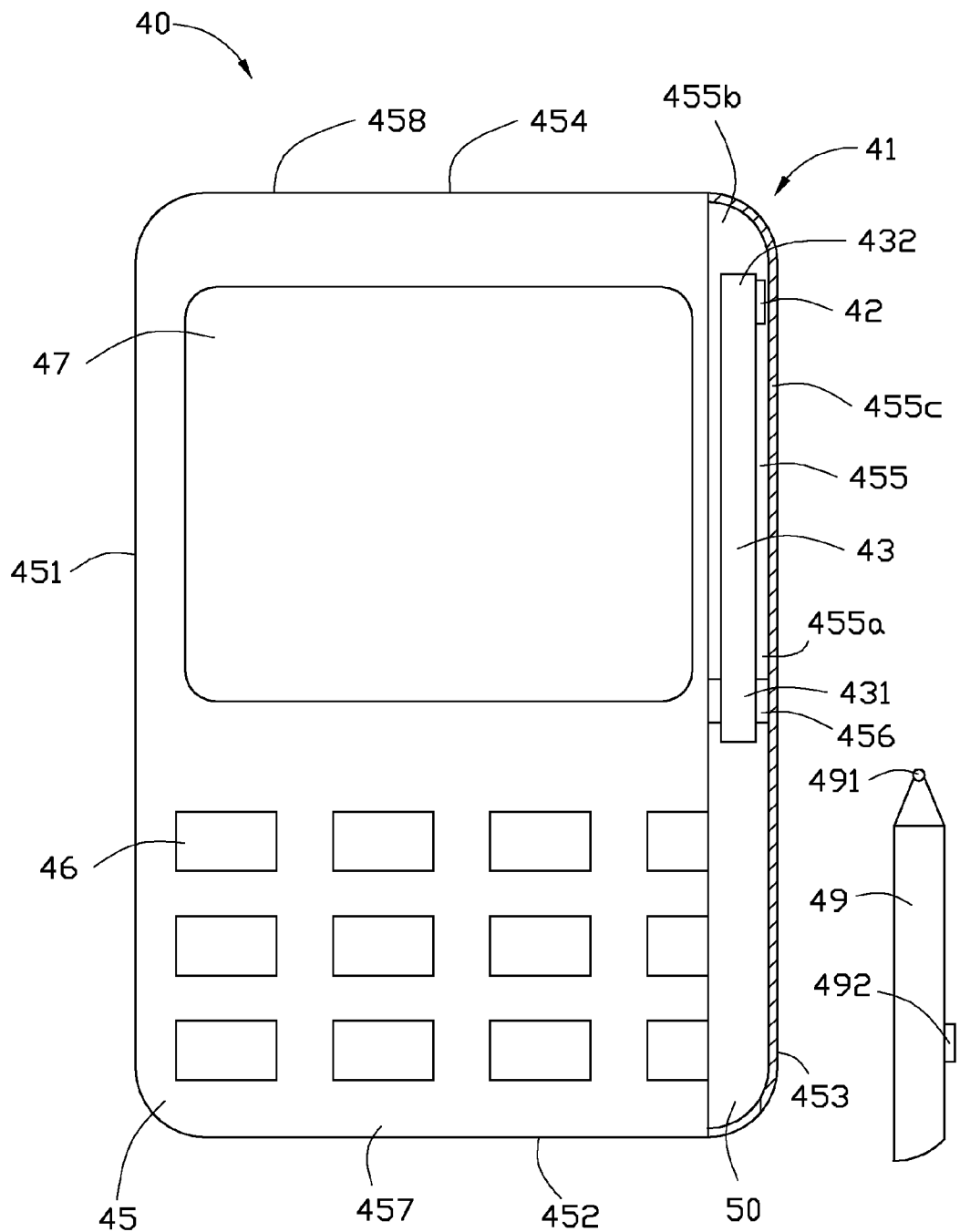
FIG. 4 is a schematic, top view of a handwriting recognition device according to a fourth embodiment of the present disclosure.
Figure 5:
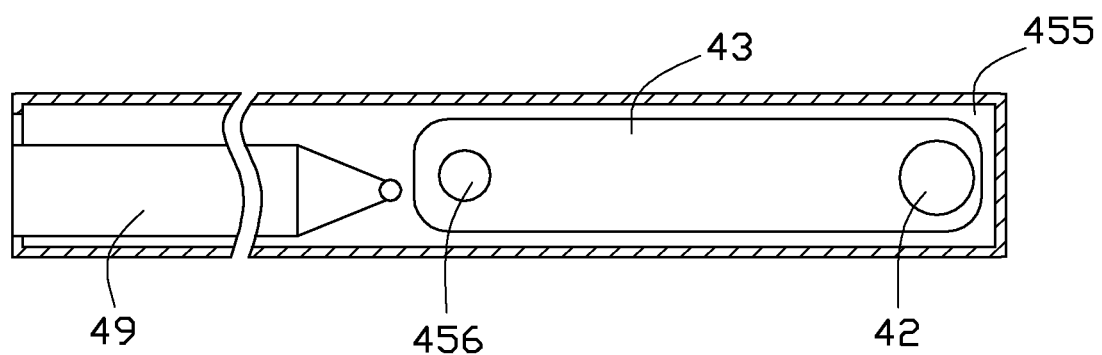
FIG. 5 is a schematic, transparent side view of the handwriting recognition device according to the fourth embodiment in rest.
Figure 6:
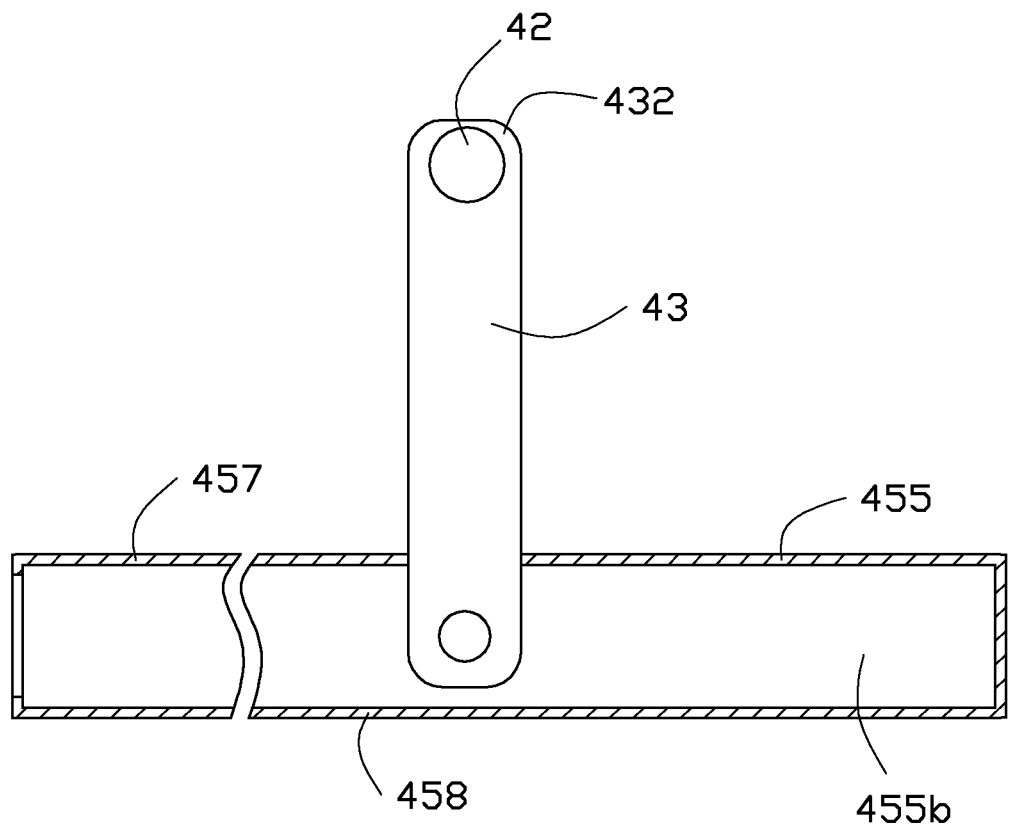
FIG. 6 is a schematic, transparent side view of the handwriting recognition device according to the fourth embodiment in use.
Figure 7:
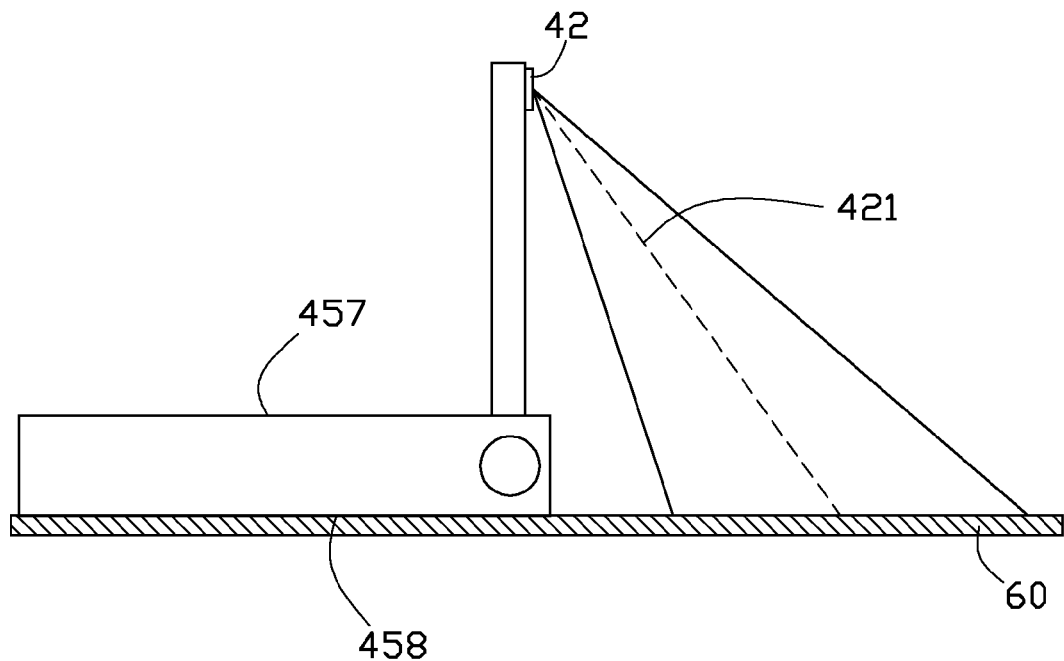
FIG. 7 is a schematic, transparent side view of the handwriting recognition device in different view angle according to the fourth embodiment in use.
Figure 8:
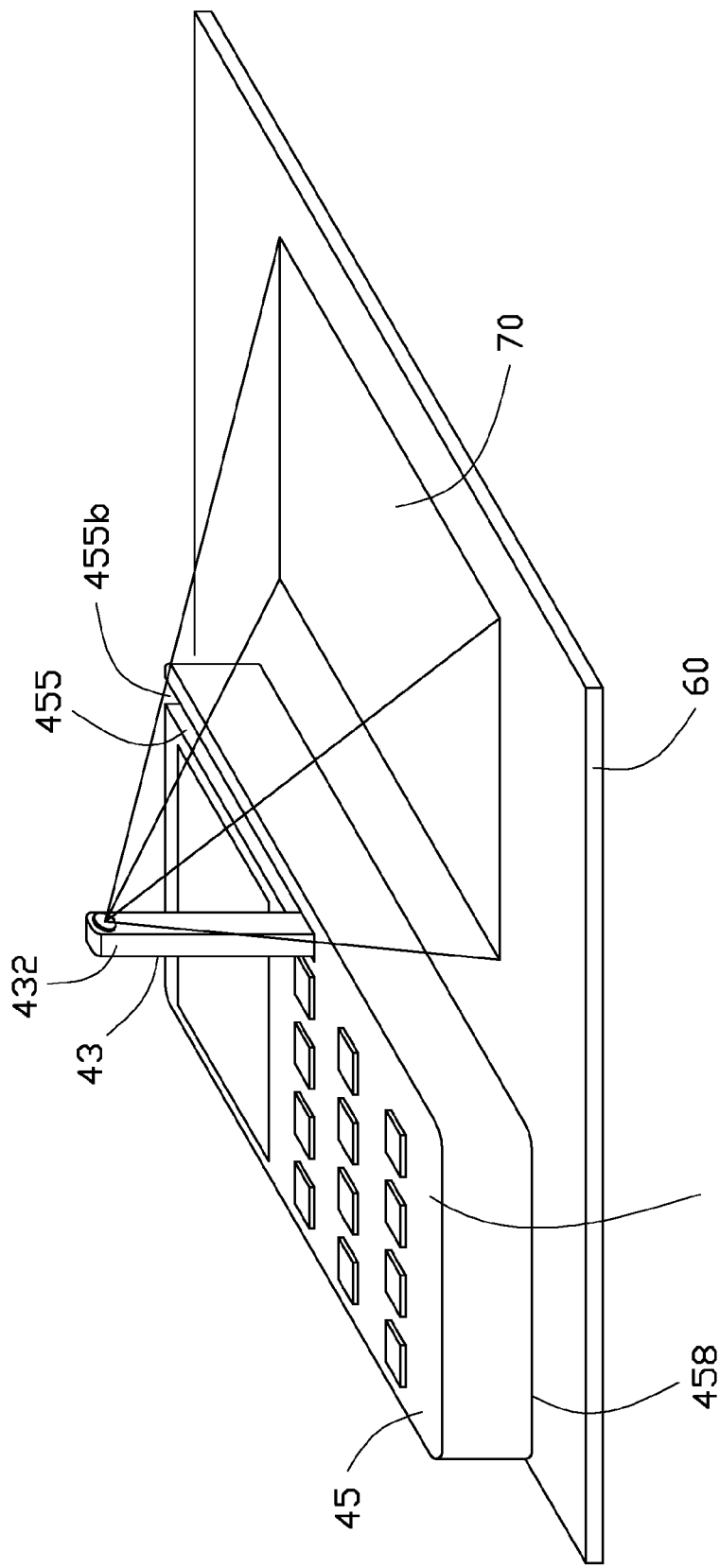
FIG. 8 is a schematic, solid view of the handwriting recognition device according to the fourth embodiment in use.

The lens module 42 is embedded in the free end 432 of the supporting rod 43 and controlled by the controller. As shown in FIGS. 4 and 5, when the supporting rod 43 is totally received in the groove 455, lens of the lens module 42 faces to a side wall 455c of the groove 455 and protected by side wall 455c. As shown in FIGS. 6 to 8, when the free end 432 of the supporting rod 43 is rotated to be perpendicular to the operation surface 457, an optical axis 421 of the lens module 42 is slanted to the supporting surface 458 at an angle of 45 degrees. A view angle of the lens module 42 projecting to an extending portion of the supporting surface 458 or the operation surface 457 is defined to be an externally input area 70. In this embodiment, the view angle of the lens module 42 is larger than 100 degrees.

The handwriting pen 49 includes a point light source 491 arranged at its top, an internal battery (not shown) for providing power to the light source 491, and a switch 492 for switching the light source 491 on or off.

When the handwriting recognition device 40 is placed on a desk top 60 and its supporting surface 458 contacts the desk top 60, a user can rotate the free end 432 of the supporting rod 43 out from the groove 455 until the supporting rod 43 perpendicularly stands up on the operation surface 457 such that the lens module 42 can face the externally defined input area 70 to take picture. Once the user moves the handwriting pen 49 in the externally defined input area 70, the lens module 42 at the top of the supporting rod 43 can instantly capture pictures of the light source 491 and send the pictures to the controller. The controller calculates coordinates of the light source 491 according to the corresponding pictures to realize the handwriting input function.

In alternative embodiments, the handwriting recognition device 40 further includes a sensor (not shown) on an internal surface of the groove 455 to sense if the supporting rod 43 is totally received in the groove 455. Therefore the handwriting recognition device 40 can automatically enter handwriting input mode when the supporting rod 43 leaves the groove 455.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A handwriting recognition device, comprising:
a main body, the main body comprising a side surface and an operation surface perpendicularly connecting to the side surface;
a first lens module and a second lens module arranged at opposite sides of the side surface, a first optical axis of the first lens module extending to perpendicularly cross a second optical axis of the second camera module outside the side surface, wherein the first optical axis and the second optical axis cooperatively define a Cartesian coordinate system that takes the first optical axis as the x-coordinate and the second optical axis as the y-coordinate, an overlapped area of a view angle of the first lens module and a view angle of the second lens module is defined as an input area, the first lens module is configured to capture a first picture of a handwriting tool in the input area, and the second lens module is configured to capture a second picture of the handwriting tool in the input area; and
a controller configured to calculate coordinates of the handwriting tool in the Cartesian coordinate system according to the first picture and the second picture.

2. The handwriting recognition device of claim 1, further comprising a light sensor and one or more light sources, wherein the light sensor generates an assistant signal when the environment brightness is below a predetermined value, and the one or more light sources are turned on according to the assistant signal to illuminate the input area.

3. The handwriting recognition device of claim 2, wherein the one or more light sources are arranged on the side surface between the first lens module and the second lens module.

4. The handwriting recognition device of claim 2, wherein the light sensor is positioned on the operation surface.

5. The handwriting recognition device of claim 1, wherein the main body is a mobile phone.

6. The handwriting recognition device of claim 1, wherein the main body is a portable media player.

7. The handwriting recognition device of claim 1, wherein the main body is a digital camera.

8. The handwriting recognition device of claim 1, wherein the main body comprises a shell configured in a cubic fashion, the shell comprises a supporting surface opposite to the operation surface, and the side surface is perpendicularly connected between the operation surface and the supporting surface.

9. The handwriting recognition device of claim 1, wherein the side surface is arranged along a long side of the operation surface.

10. The handwriting recognition device of claim 1, further comprising a keyboard and a display screen, the keyboard and the display screen being formed on the operation surface.

11. The handwriting recognition device of claim 1, wherein view angles of the first lens module and the second lens module are greater than 90 degrees.

12. The handwriting recognition device of claim 1, wherein the handwriting tool is a handwriting pen.

13. The handwriting recognition device of claim 1, wherein the handwriting tool comprises a light source formed at its top.

14. A handwriting recognition device, comprising:
a main body, the main body comprising a side surface and an operation surface connecting to the side surface, the operation surface including a display screen surrounded by two opposite long sides and two opposite short sides, the side surface connected with the operation surface at one of the two long sides;
a first lens module and a second lens module arranged at opposite sides of the side surface, both of a first optical axis of the first lens module and a second optical axis of the second lens module being inclined to the side surface, the first optical axis extending to perpendicularly cross the second optical axis outside the side surface, wherein an overlapped area of a view angle of the first lens module and a view angle of the second lens module is defined as an input area, the first lens module is configured to capture a first picture of a handwriting tool in the input area, and the second lens module is configured to capture a second picture of the handwriting tool in the input area; and a controller configured to calculate coordinates of the handwriting tool according to the first picture and the second picture, wherein the first optical axis and the second optical axis cooperatively define a Cartesian coordinate system that takes the first optical axis as the x-coordinate and the second optical axis as the y-coordinate, and wherein the controller calculates the coordinates of the handwriting tool in the Cartesian coordinate system.

* * * * *